United States Patent [19]

Melahn et al.

[11] Patent Number: 5,963,955
[45] Date of Patent: Oct. 5, 1999

[54] BRIDGE FOR EXPORTING AND IMPORTING OBJECTS BETWEEN OBJECT ORIENTED PROGRAMMING ENVIRONMENTS

[75] Inventors: Gregory Thomas Melahn, Cary; Samuel Anthony Ruby, Raleigh; Anthony Hayden Lindsey, Fuquay Varina; John Henry Koch, III, Apex, all of N.C.; Steven Michael Milinkovich, Nepean, Canada

[73] Assignee: International Business Machines Corporation, Armonk, N.Y.

[21] Appl. No.: 08/940,822

[22] Filed: Sep. 30, 1997

[51] Int. Cl.⁶ ..................................... G06F 17/30
[52] U.S. Cl. ........................... 707/103; 707/102; 707/100
[58] Field of Search ..................................... 707/103, 100, 707/102; 395/701, 710

[56] References Cited

U.S. PATENT DOCUMENTS

| | | | |
|---|---|---|---|
| 5,729,744 | 3/1998 | Gerken et al. | 707/203 |
| 5,758,351 | 5/1998 | Gibson et al. | 707/104 |
| 5,806,066 | 9/1998 | Golshani et al. | 707/100 |
| 5,812,981 | 9/1998 | Noguchi et al. | 705/1 |
| 5,832,498 | 11/1998 | Exertier | 707/103 |
| 5,848,273 | 12/1998 | Fontana et al. | 395/701 |
| 5,848,415 | 12/1998 | Guck | 707/10 |
| 5,850,631 | 12/1998 | Golshani et al. | 707/102 |
| 5,878,425 | 3/1999 | Redpath | 707/102 |

*Primary Examiner*—Anton Fetting
*Assistant Examiner*—Greta L. Robinson
*Attorney, Agent, or Firm*—Myers Bigel Sibley & Sajovec, P.A.; Gregory M. Doudnikoff

[57] ABSTRACT

A bridge for exporting and importing Envy components to and from a TeamConnection object oriented programming environment includes an Envy side and a TeamConnection side. The Envy side of the bridge creates and transfers an Envy library file that contains the contents of a selected Envy component and a Bill of Materials that describes the contents of the Envy Library file. The TeamConnection side of the bridge searches the transferred Bill of Materials for keywords associated with objects. The TeamConnection side of the bridge then creates a TeamConnection part for each object identified by a respective keyword. To import an Envy component stored within a TeamConnection object oriented programming environment, the TeamConnection side of the bridge creates and transfers an Envy library file containing the contents of the Envy component and a Bill of Materials describing the contents of the Envy library file. The Envy side of the bridge searches the Bill of Materials for keywords. Each identified object is then transferred into the Envy Manager of the Envy object oriented programming environment.

15 Claims, 8 Drawing Sheets

BRIDGE FOR EXPORTING AND IMPORTING OBJECTS BETWEEN OBJECT ORIENTED PROGRAMMING ENVIRONMENTS

FIELD OF THE INVENTION

This invention relates generally to object oriented programming, and more particularly to object oriented programming within team programming environments.

BACKGROUND OF THE INVENTION

Object oriented programming is a computer programming packaging technique which provides reusable and easily expandable programs. In a traditional procedural program, emphasis is placed on methods to be conducted on particular data sets. By contrast, in an object oriented program, emphasis is placed on data. As is well known to those having skill in the art of object oriented programming, object oriented programs are composed of various types of "objects".

An object is a data structure, also referred to as a "frame", and a set of operations or functions, also referred to as "methods", for accessing and manipulating the data structure. Objects having identical data structures and common behavior can be grouped together into, and collectively identified as a "class." Objects are instances created from a particular class. Each object inherits the data structure and methods of the particular class from which it was instantiated. A hierarchical inheritance relationship exists between multiple classes. For example, one class may be considered a "parent" of another class (the "child" of the parent class). The child class is said to be "derived" from the parent class and inherits all of the attributes and methods of the parent class.

Increasingly, developers are utilizing a team approach in developing object oriented program applications. Component-based development is quickly becoming the focus of many new development efforts. In this type of development, team members working on an application share components stored in libraries to build applications. Components are basically encapsulated software objects, or specifications capable of creating such objects, providing some type of known service that can be used in combination with other components to build applications.

TeamConnection is a software product of International Business Machines, Inc. that provides a team development environment that includes the following: configuration management; version management; change management; and build support for developing multi-tier, multi-language applications across platforms. TeamConnection provides a single repository for development data including reusable parts such as JavaBeans and ActiveX, source code such as C++, COBOL and Java, web applets, HTML documents, end user documentation, test cases, and modeled objects. Envy is another software product of International Business Machines, Inc. that provides a multi-user development environment for application development using the object oriented programming languages Smalltalk and Java. Envy provides version control and configuration management for multiple developers across several platforms.

Envy and TeamConnection individually facilitate parallel development involving multiple developers. Each provides various mechanisms for allowing developers to access the same objects or components in a corresponding library at the same time without negatively affecting the work of others. Each also mediates changes made to objects by multiple developers and for controlling the versions of objects stored in the library.

It would be desirable to allow developers working in TeamConnection to be able to use components from an Envy library. Unfortunately, the schemas that Envy and TeamConnection use for version control and configuration management are substantially different from each other. As a result, exporting and importing Envy components between TeamConnection and Envy has heretofore not been possible because of these different schemas. Furthermore, objects stored in a TeamConnection library may be different types of objects than objects stored in an Envy library. For example, objects stored in a TeamConnection library may be C++ objects, whereas objects stored in an Envy library may be Java objects. Applications built in TeamConnection using objects from the TeamConnection library may have difficulty understanding and utilizing objects from an Envy library.

SUMMARY OF THE INVENTION

In view of the above discussion, it is an object of the present invention to allow developers working in TeamConnection to be able to use components from an Envy library.

It is another object of the present invention to allow an object from an Envy library to be incorporated into an application built within a TeamConnection environment even though the Envy object is created by an object oriented program different from the object oriented program utilized to create objects in the TeamConnection library.

These and other objects of the present invention are provided by a "bridge" for exporting an Envy component from an Envy object oriented programming environment to a TeamConnection object oriented programming environment, and for importing an Envy component from a TeamConnection object oriented programming environment. The bridge includes an Envy side and a TeamConnection side. When a user selects an Envy component from an Envy object oriented programming environment, the Envy side of the bridge creates an Envy library file that contains the contents of the selected Envy component. A second file, referred to as a "Bill of Materials" is also created by the Envy side of the bridge. The Bill of Materials describes the contents of the Envy Library file. The Envy side of the bridge then transfers the Envy library file and the Bill of Materials to the TeamConnection side of the bridge. The transferred Bill of Materials is searched by the TeamConnection side of the bridge for keywords. Each keyword within the Bill of Materials identifies an object. The TeamConnection side of the bridge creates a part for each object identified by a respective keyword. The TeamConnection side of the bridge also creates a part to hold the contents of the Envy library file.

Envy components stored within a TeamConnection object oriented programming environment may be imported into an Envy object oriented programming environment, as well. A user selects an Envy component to import from the TeamConnection object oriented programming environment. The TeamConnection side of the bridge creates an Envy library file containing the contents of the selected Envy component. The TeamConnection side of the bridge also creates a Bill of Materials that describes the contents of the Envy library file. The TeamConnection side of the bridge then transfers the Envy library file and the Bill of Materials to the Envy side of the bridge. The transferred Bill of Materials is searched by the Envy side of the bridge for keywords which identify objects. Each identified object is then transferred into the Envy Manager of the Envy object oriented programming environment.

The present invention is advantageous because developers working in a TeamConnection environment can access and utilize components from an Envy library. TeamConnection provides capabilities for managing these components and building applications that Envy does not. For example, TeamConnection provides a mechanism for associating a particular set of changes with a defect or feature number so you can see things like what specifically was changed in response to a customer noted problem. Another example is that TeamConnection provides a mechanism for building applications on other platforms.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMS, optical storage devices, or magnetic storage devices.

Figure 1:
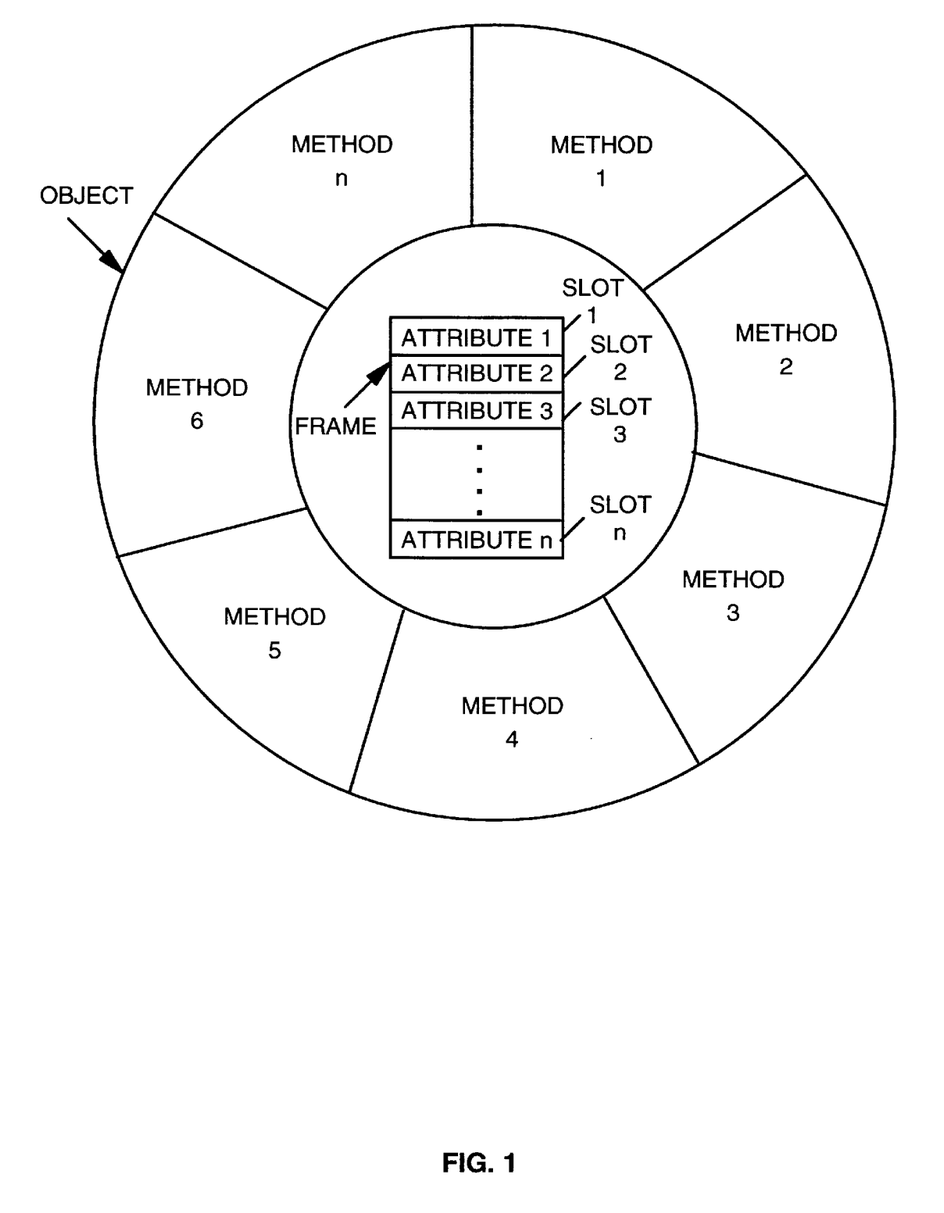
FIG. 1 schematically illustrates an object used within an object oriented program.

FIG. 1 schematically illustrates an object comprising a data structure and a set of methods for accessing the data structure. The data structure is represented as a frame comprised of many slots, wherein each slot contains an attribute of the object. An attribute may be a primitive, i.e., an integer or a string, or a pointer to another object. A pointer is basically a memory address of a particular object or class. As illustrated, the frame of an object is "encapsulated" by its methods.

The blueprint from which every object is created is known as a class. All the attributes and methods for an object are specified in the class from which the object is created. Every object is referred to as an "instance" of its class. A hierarchical relationship typically exists among object classes. A parent object class often has child classes, or subclasses, related to it. An object subclass inherits all of the data characteristics and methods of its parent object class. In addition, some object oriented programs may permit the addition of attributes and methods to child classes.

Figure 2:
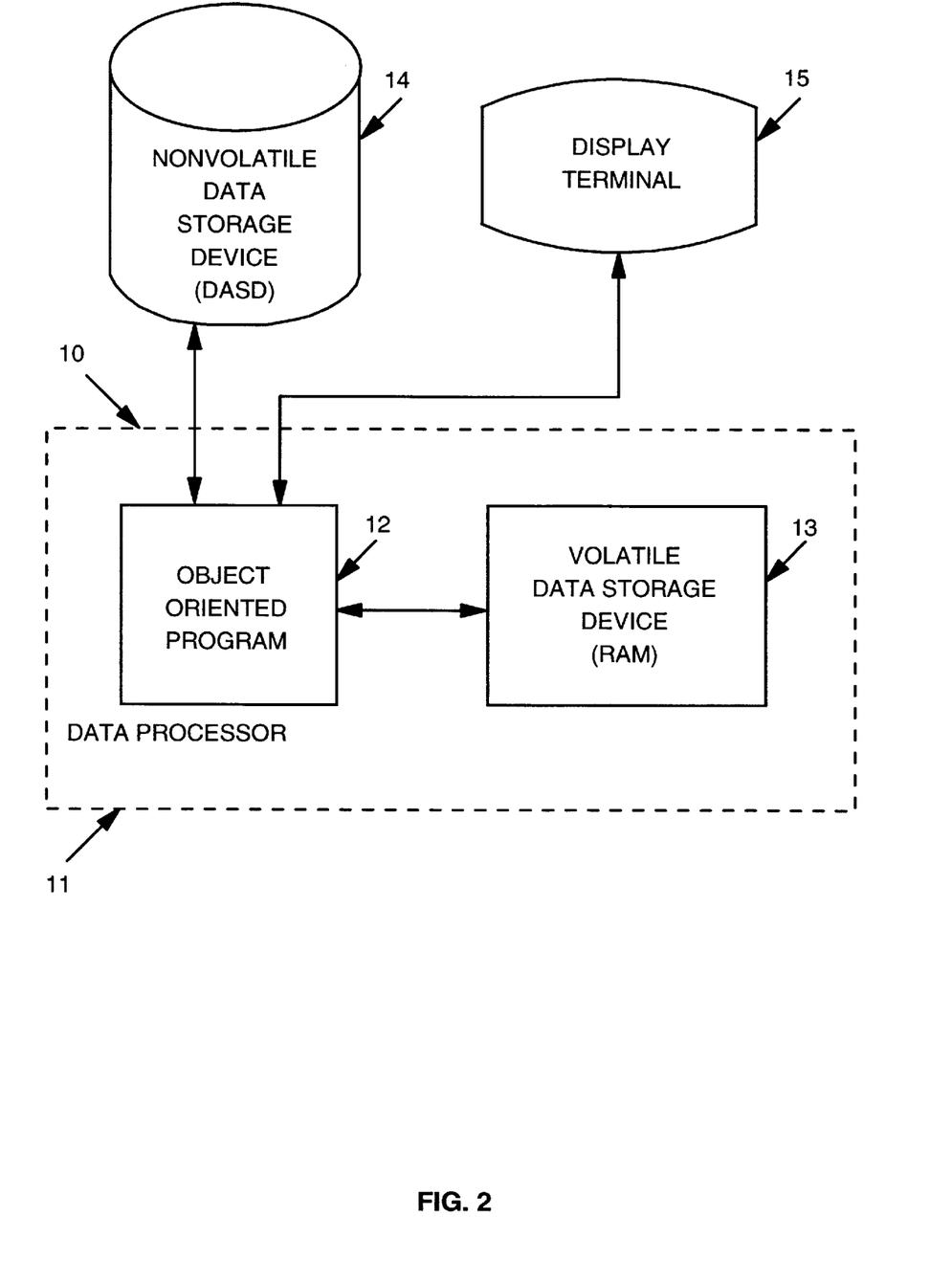
FIG. 2 schematically illustrates a hardware and software environment in which the present invention may operate.

Referring now to FIG. 2, a schematic diagram of a hardware and software system in which the present invention may operate will now be described. The system 10 includes a data processor 11 which may be a mainframe computer, minicomputer, workstation or personal computer. As is well known to those having skill in the art, the data processor 11 typically includes a volatile data storage device 13, typically random access memory (RAM) for providing a working store for active data and intermediate results. System also typically includes a nonvolatile data storage device 14 for permanent storage of objects. Device 14 may be a direct access storage device, a tape file, an erasable optical disk, or other well known devices. A display terminal 15 including a screen or other display, and a keyboard, is also included.

An object oriented program 12 is also included in the data processor 11. Object oriented program 12 may be programmed in various object oriented programming languages such as C++, Smalltalk, Java or variations thereof, or in conventional programming languages such as FORTRAN or COBOL. The design and operation of an object oriented program is well known to those skilled in the art of object oriented programming systems, and will only be described generally below.

Figure 3:
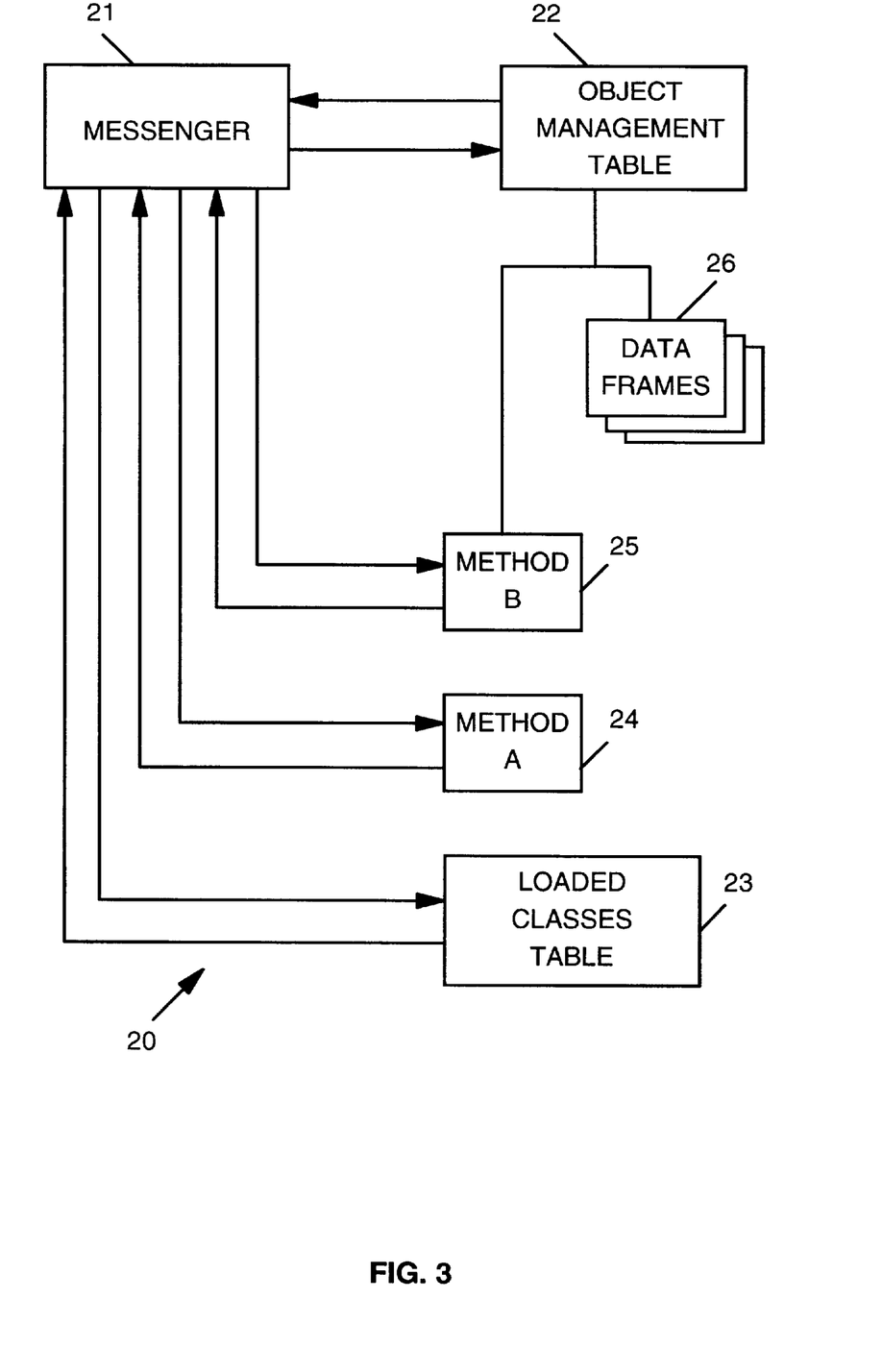
FIG. 3 schematically illustrates components of an object oriented computing system.

Referring now to FIG. 3, the main components of an object oriented program (12, FIG. 2) will be described. Object oriented program 12 includes three primary components: a Messenger 21, an Object Management Table 22 and a Loaded Classes Table 23. The Messenger 21 controls communications between calling and called messages, Object Management Table 22 and Loaded Classes Table 23. Object Management Table 22 contains a list of pointers to all active object instances. The Loaded Classes Table 23 contains a list of pointers to all methods of active object classes.

Operation of the Object Oriented program 12 will now be described for the example illustrated in FIG. 3, in which Method A (Block 24) of an object sends a message to Method B (Block 25) of an object. Method A sends a message to Method B by calling Messenger 21. The message contains (1) an object reference of the instance to receive the message, (2) the method the object instance is requested to perform on the data it encapsulates, and (3) any parameters needed by the receiving method. Messenger 21 obtains a pointer to the data frame 26 of the instance object specified by Method A, by searching Object Management Table 22 for the instance object. If the specified instance object cannot be found, Object Management Table 22 adds the instance object to the table and calls the instance to materialize its data from the database. Once in the instance table, Object Management Table 22 returns the pointer to the materialized instance object.

Messenger 21 then obtains the address of Method B from the Loaded Classes Table 23. If the instance's class is not loaded, the Loaded Classes Table 23 will load it at this time to materialize its data. The Loaded Classes Table 23 searches for the specified method (Method B) and returns the address of the method to Messenger 21. The Messenger 21 then calls Method B, passing it a system data area and the parameters from the call made by Method A including the pointer. Method B accesses the data frame 26 using the pointer. Method B then returns control to the Messenger 21 which returns control to Method A.

The design and operation of computer platforms and object oriented computing programs, including that of an object manager, are well known to those having skill in the art and are described, for example in U.S. Pat. No. 5,161,225 to Abraham et al. entitled Persistent Stream for Processing Time Consuming and Reusable Queries in an Object Oriented Database Management System; U.S. Pat. No. 5,151,987 to Abraham et al. entitled Recovery Objects in an Object Oriented Computing Environment; and U.S. Pat. No. 5,161,223 to Abraham entitled Resumeable Batch Query for Processing Time Consuming Queries in an Object Oriented Database Management System, all assigned to the assignee of the present invention, the disclosures of which are hereby incorporated herein by reference, and in numerous textbooks such as Object Oriented Software Construction by Bertrand Meyer, published by Prentice Hall in 1988, the disclosure of which is incorporated herein by reference.

Team Programming Environments

The present invention relates to two team programming environments for developing object oriented program applications: TeamConnection and Envy. Each of these environments include software configuration and data management systems and allow developers to store and retrieve objects or components in a respective repository. In particular, the present invention allows developers working in TeamConnection to be able to use components stored in an Envy library as parts within TeamConnection.

An Envy component is an Envy software object that has a unique name and that is "versioned", as is known to those skilled in the art of object oriented programming. For example, a method is a component and a class is a component. An application, which is a collection of classes, may also be a component.

A TeamConnection part is a uniquely named and "versioned" object stored in TeamConnection. As is known to those skilled in the art of object oriented programming, TeamConnection provides an open model for using classes to create managed objects. A part class can be subclassed by applications to create versioned objects for application specific purposes. For example, the bridge, which will be described below, uses subclasses of a part named "TCPart", such as "EmClass" and "EmMethod", to store the objects it discovers in the bill of materials (also described below). Other uses of parts include storing items such as COBOL source code files.

A TeamConnection part is different from an Envy component because the TeamConnection model is open for use and extension by applications. TeamConnection parts, thus, have more generic uses than Envy components. Envy components are optimized for managing Smalltalk and Java application development. The model for versioning TeamConnection parts is completely different from that used for Envy components, as is known to those skilled in the art of object oriented programming. TeamConnection supports the development of client/server and distributed applications on Multiple Virtual Storage (MVS), OS/2, and Windows operating systems, and can be configured as stand-alone, or in LAN-based client/server mode.

Developers utilizing the TeamConnection environment, are permitted to "check-out" parts from the TeamConnection repository to a work area. A work area is used by developers to modify existing parts and create new parts for an application. To retrieve a part from TeamConnection, a developer uses an application that checks out the part and brings over the part contents in some form that the user can work with. For example, for a part that stores C++ source code, the application would be one that retrieved the contents into a file so the developer could employ a text editor to modify the C++ source code. Then, when the changes are complete, the developer uses the same application to move the new contents back into TeamConnection. The developer then asks TeamConnection to build the C++ code into an executable. TeamConnection gives the contents of the part to a C++ compiler to produce the executable which is then saved in TeamConnection. The developer can now retrieve and test the executable.

Developers utilizing the Envy environment can share and reuse components stored within a database. In Envy, a developer works in a tightly integrated development environment (IDE). The developer connects this IDE to an EnvyManager and loads a selection of components to work with into a development image. As is known to those skilled in the art of the Envy object oriented programming environment, an image is essentially a cache. The developer then makes modifications using an IDE editor, saves the modifications and compiles them incrementally as the components are saved. When the developer is finished, he/she selects the finished components that comprise the resulting application and packages it. The EnvyManager is the Envy server that a developer is connected to for the purpose of obtaining and placing components from and to an Envy library, respectively.

Envy-TeamConnection Bridge

Figure 4A:
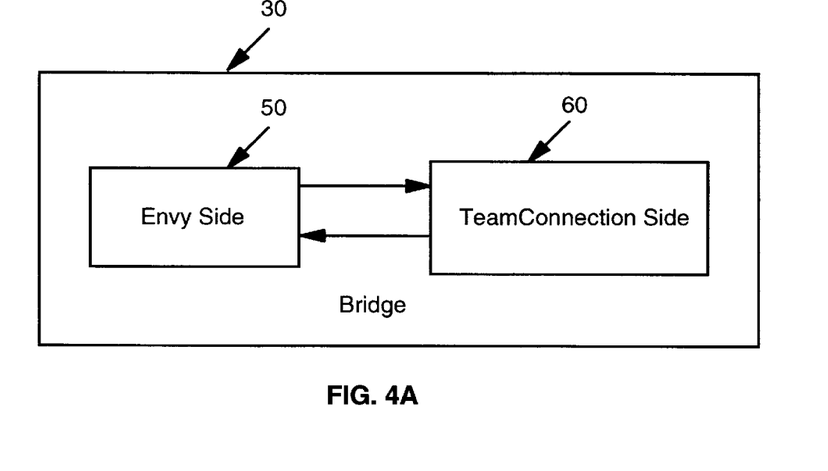
FIGS. 4A–4B schematically illustrate a bridge for exporting and importing components between Envy and TeamConnection, according to the present invention.
Figure 4B:
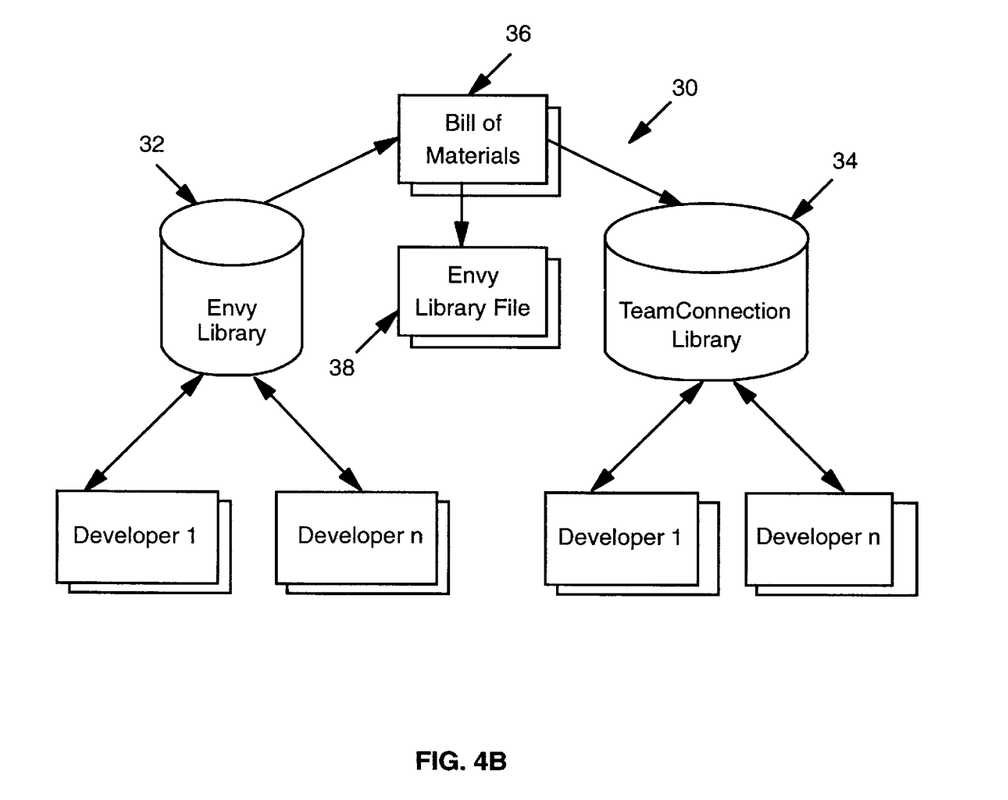

Referring now to FIGS. 4A and 4B, a "bridge", 30 between an Envy development environment 32 and a TeamConnection development environment 34, according to the present invention, is schematically illustrated. The bridge 30 is a set of Envy and TeamConnection code that provides the mechanism for exporting and importing Envy components to and from TeamConnection, respectively. The bridge 30 includes an Envy side 50 and a TeamConnection side 60 (FIG. 4A) for transferring and receiving Envy library files and related "Bill of Materials" files. In FIG. 4B, an Envy development environment 32 and a TeamConnection development environment 34 are illustrated with multiple developers accessing each respective library. A Bill of Materials 36 and an Envy library file 38 are schematically illustrated as being transferred to the TeamConnection environment 34 via the bridge 30, as described in detail below. The Envy and TeamConnection code for each respective side of the bridge may be written in a variety of object oriented programming languages, including, but not limited to, Java, Smalltalk and C++.

Figure 5A:
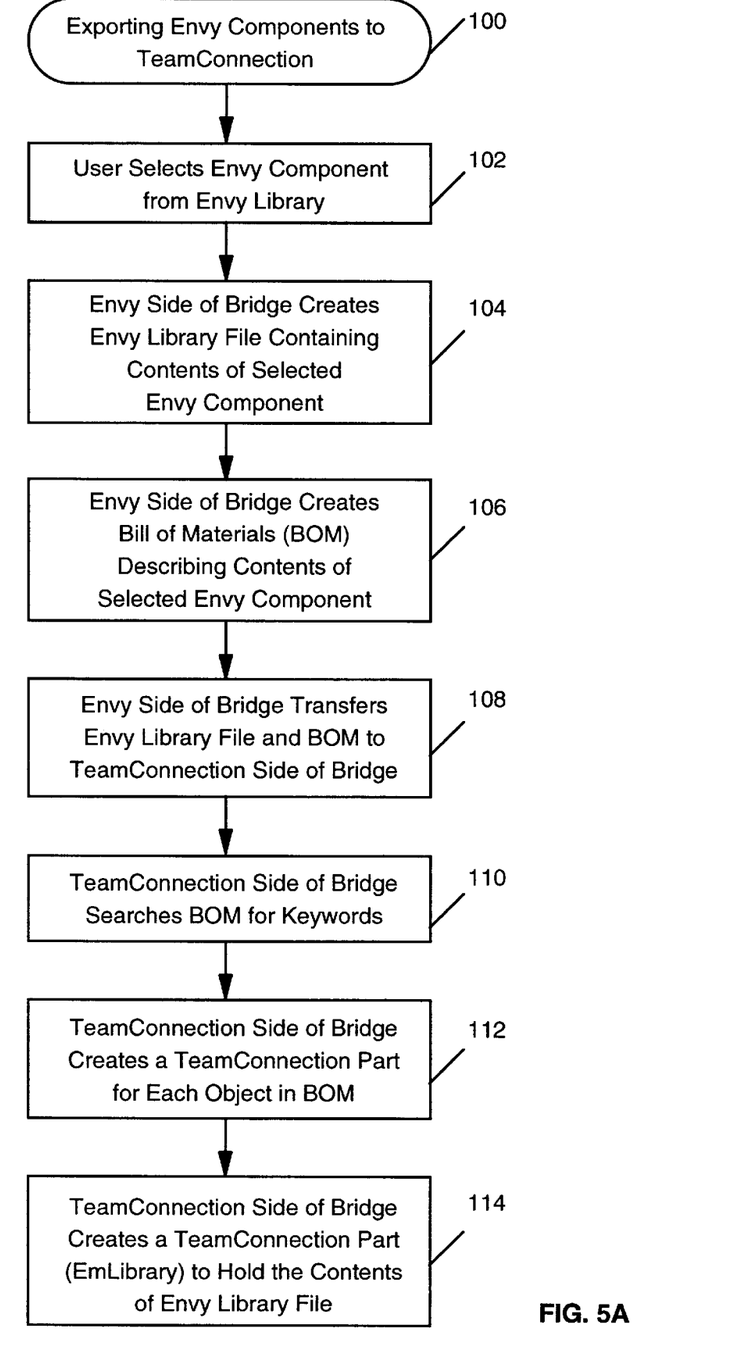
FIG. 5A is a flowchart illustrating operations for exporting Envy components to TeamConnection.

Referring now to FIG. 5A operations for exporting Envy components to TeamConnection are schematically illustrated. A user initially selects, for export to TeamConnection, an Envy component from an Envy library (Block 102). The user also selects a TeamConnection work area within which to work with the selected Envy component. When the user selects the Envy component, the Envy side 50 of the bridge 30 creates an Envy library file, containing the contents of the selected Envy component. (Block 104). The Envy side 50 of the bridge 30 also creates a text file, referred to as a "Bill of Materials" (BOM) (Block 106). The Bill of Materials describes the contents of the Envy library file.

Next, the Envy side 50 of the bridge 30 transfers the Envy library file and the BOM to the TeamConnection side 60 of the bridge 30 (Block 108). The TeamConnection side 60 of the bridge 30 then searches the BOM for various keywords (Block 110). The TeamConnection side 60 of the bridge 30 then creates TeamConnection "parts" for each object identified by a keyword in the BOM (Block 112). The TeamConnection side 60 of the bridge 30 then creates a TeamConnection part of type "EmLibrary" to hold the contents of the Envy library file (Block 114).

The keywords tell TeamConnection what kind of object to create and the name for the object. For example the keyword "EmConfigurationMap:foo:123" tells TeamConnection to create an object of class "EmConfigurationMap" and name it "foo." Other keywords tell TeamConnection what attributes to set. For example, the keyword "Owner=fred" tells TeamConnection to set the "Owner" attribute to the value "fred."

When a keyword is found, an object is created having a unique name that reflects what the object is. This is performed for each keyword in the Bill of Materials. An exemplary convention that TeamConnection uses to assign TeamConnection names using Envy names is illustrated in Table 1.

TABLE 1

| EnvyClass | TeamConnection Name |
|---|---|
| EmLibrary | <class_name_of_object_in_blob>.<name_of_object_in_blob> <br> e.g., EmApplication.MyApp, EmConfigurationMap.MyConfigMap |
| EmConfigurationMap | <name_of_config_map> <br> e.g., MyConfigMap |
| EmApplication | <name_of_application> <br> e.g., MyApp |
| EmSubapplication | <name_of_application>.<name_of_subappplication> <br> e.g., MyApp.MySubapp |
| EmClass OR EmClassExtension | <name_of_application>.<name_of_class> OR <name_of_application>.<name_of_subapplication>.<name_of_class> <br> e.g., MyApp.MyClass, MyApp.MySubapp.MyClass |
| EmInstanceMethod OR EmClassMethod | <name_of_application>.<name_of_class>.<name_of_method> OR <name_of_application>.<name_of_subapplication>.<name_of_class>.<name_of_method> <br> e.g., MyApp.MyClass.MyMethod, MyApp.MySubapp.MyClass.MyMethod |

The contents of the Envy library file are saved in a part of the class "EmLibrary", which is a new subclass of an existing class "TCPart." The Envy Library file is a temporary container for this data. Once the part is saved in TeamConnection, the Envy library file is discarded. EmLibrary is typically a binary large object (BLOB) whose contents are opaque to TeamConnection. TeamConnection can store EmLibrary, but does not understand what type of file EmLibrary is or what format EmLibrary has.

As would be understood by those skilled in the art of TeamConnection object oriented programming environments, the name of a TeamConnection part is derived from its contents. For example, an EmLibrary part containing the contents of the Envy configuration map "foo" is named "EmConfigurationMap.foo." When the part is later retrieved from TeamConnection, it is dumped into an EmLibrary file so Envy has something to import from.

As an example of TeamConnection parts created for objects found within the BOM (Block 112), the TeamConnection side 60 of the bridge 30 may create and store in TeamConnection the following new subclasses of existing class "TCPart": "EmConfigurationMap"; "EmApplication"; "EmSubapplication"; "EmMethod"; and "EmClass." Two new TeamConnection relationships, "contains" and "parts", are used to reflect the containment hierarchies that exist in Envy. The "contains" relationship represents a one-to-many relationship that can exist between two Envy components, such as "EmClass" and "EmMethod." The "parts" relationship represents a many-to-many relationship that can exist between two Envy components, such as "EmApplication" and "EmSubapplication."

The TeamConnection model uses relationships to logically connect parts together. These relationships are actually parts too, and are likewise versioned. The relationships know what objects are connected together and why. The relationships can impose constraints to keep the user from doing something wrong. The bridge 30 uses these relationships to remember what EmLibrary part is the container of the data for an Envy part stored in TeamConnection.

The present invention is particularly advantageous because TeamConnection provides object tracking and versioning capabilities that Envy does not provide. For example, the Envy Manager does not allow the correlation of defect numbers and text describing what the defects were in an application. Accordingly, changes made to Envy classes and methods can be versioned and tracked via TeamConnection. As is understood by those skilled in the art of object oriented programming, tracking capabilities are particularly valuable for tracking defects in applications, objects, classes and the like, and for determining how a class or method changed and who made the change.

Figure 5B:
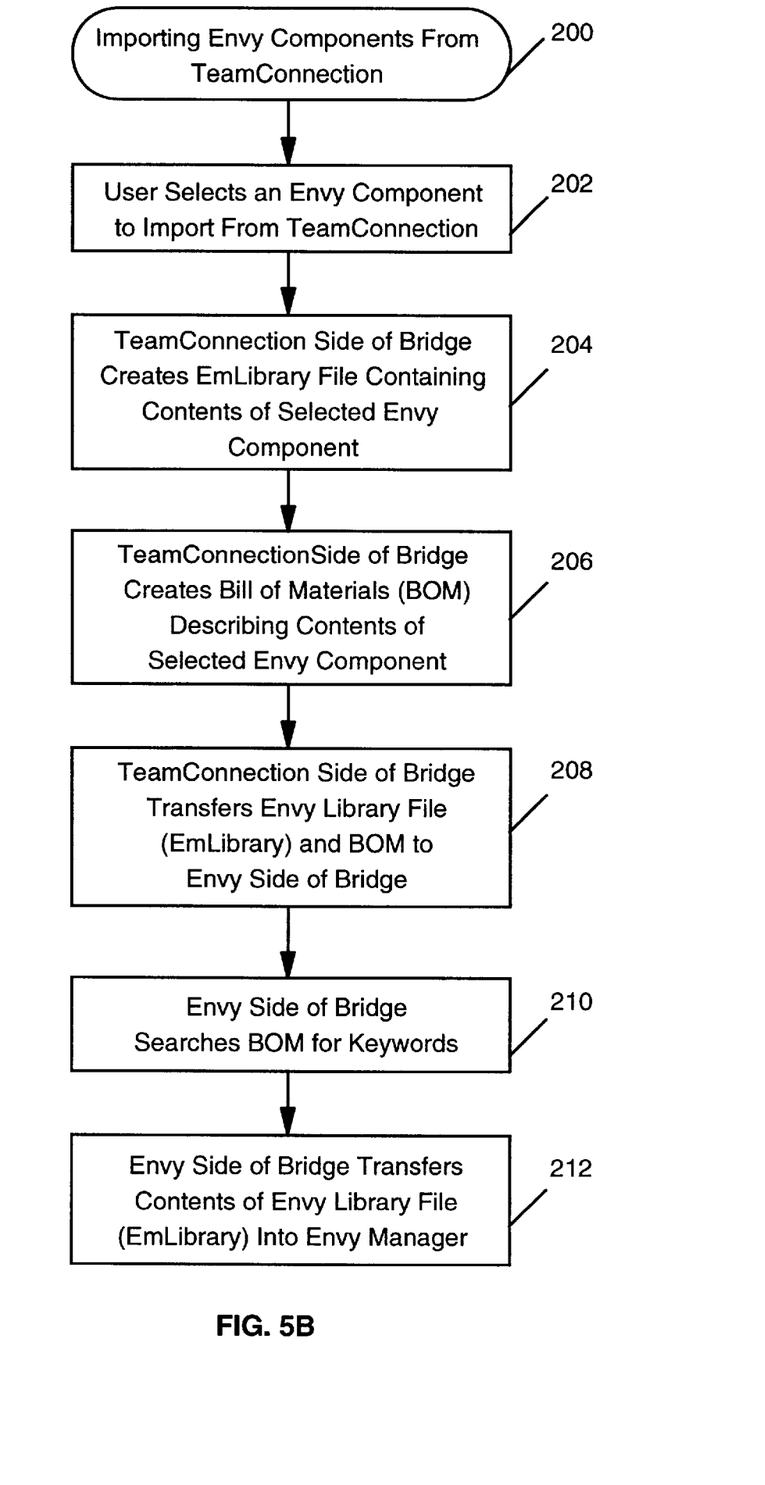
FIG. 5B is a flowchart illustrating operations for importing Envy components from TeamConnection.

Referring now to FIG. 5B, operations for importing Envy components from TeamConnection (Block 200) are schematically illustrated. A user selects an Envy component to Import from TeamConnection (Block 202). The user also selects a TeamConnection work area within which to work with the selected Envy component. The TeamConnection side 60 of the bridge 30 creates an "EmLibrary" file containing the contents of the selected Envy component (Block 204). The TeamConnection side 60 of the bridge 30 also creates a Bill of Materials (BOM) describing the contents of the selected Envy component (Block 206).

Next, the TeamConnection side 60 of the bridge 30 transfers the EmLibrary file and the BOM to the Envy side 50 of the bridge 30 (Block 208). The Envy side 50 of the bridge 30 then searches the BOM searching for various keywords as described above with respect to the TeamConnection side 60 of the bridge 30 (Block 210). The Envy side 50 of the bridge 30 then imports the extracted library files into the connected Envy Manager (Block 212).

Once the EmLibrary file is retrieved from TeamConnection and imported into the EnvyManager, the developer then goes through a separate step to load a specific version of the component into his/her image. The EnvyManager can hold many versions of the same component, and all may have come from TeamConnection. The developer can use whichever version of a component he/she loads. The "contains" relationship established above allows TeamConnection to know which EmLibrary part to extract for a specified Envy component.

Transmitting Changes in Envy Library Files to TeamConnection

Envy library files stored in TeamConnection are typically large files of over one hundred thousand bytes (100k) of data. For each new version of an Envy component that is to be utilized in TeamConnection a revised Envy library file needs to be stored within TeamConnection as described above. Typically, however, the differences between two versions of an Envy library file are often small. An Envy library file is composed of a sequential set of variable length records as illustrated below in Table 2.

TABLE 2

| |
| --- |
| LibraryHeader |
| RecordHeader_1 |
| Record_1 |
| RecordHeader_2 |
| Record_2 |
| . |
| . |
| . |
| RecordHeader_n |
| Record_n |

The present invention allows an updated Envy library file to be stored within TeamConnection without storing a complete copy of each version in TeamConnection. Only the portions of the library file that have changed since a previous version of the file are stored in TeamConnection. Accordingly, computer disk space and memory that would otherwise be needed to store the entire file to TeamConnection are not required.

Figure 6:
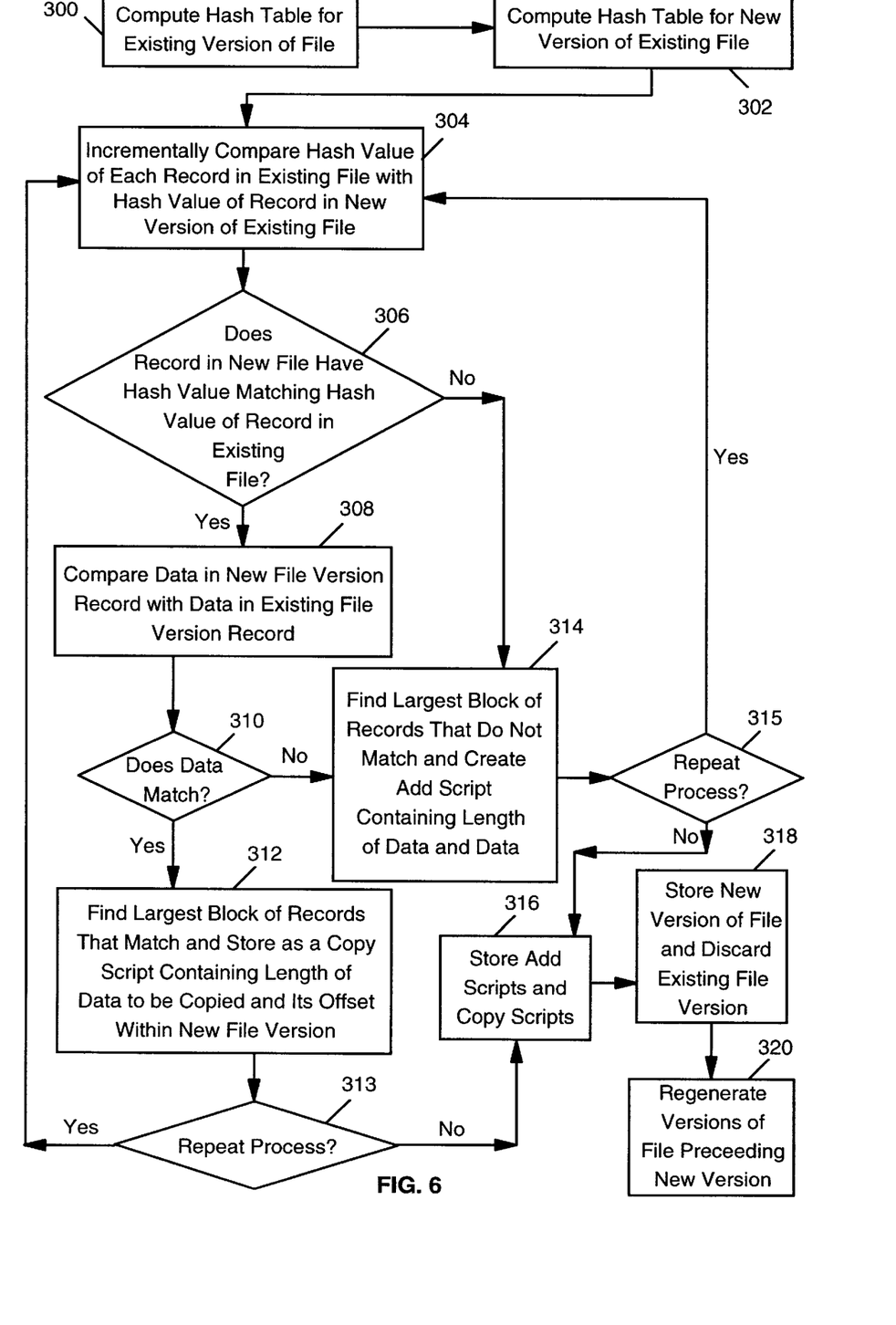
FIG. 6 is a flowchart illustrating operations for storing a new version of an existing library file to TeamConnection.

Referring now to FIG. 6, operations for storing a new version of an existing library file to TeamConnection in accordance with aspects of the present invention are illustrated. A hash table is computed for the existing version of the library file (Block 300). A hash table is also computed for the new version of the existing library file (Block 302). Each of these hash tables contain a hash value for each record in the existing version of the library file and the new version of the existing library file, respectively.

Next, the new version of the existing library file is processed sequentially, record by record. The hash values for each record of the new version of the library file are compared with the hash values of the records in the existing version of the library file (Block 304). If a record in the new version of the library file is found to have the same hash value as a record in the old version of the file (Block 306), the data in the record of the new file version is compared with the data in the existing file version (Block 308). If the data matches (Block 310), the largest block of records that match are found and stored as a "copy script" which is a data structure that contains the length of data to be copied and the offset of the data within the new file version (Block 312). The term "offset" refers to the location of data within a file. Operations represented by Blocks 304–310 are repeated (Block 313) until the end of each file is reached.

If the data does not match (Block 310), or if a record in the new version of the library file is found not to have the same hash value as a record in the old version of the file (Block 306), the largest block of records that do not match are found and stored as an "add script" which contains the length of data and the data itself (Block 314). Operations represented by Blocks 304–310 are repeated (Block 315) until the end of each file is reached.

The add and copy scripts are stored in TeamConnection (Block 316) so that a copy of the old version of the file can be built therefrom. The new version of the file is stored in TeamConnection and the existing file is discarded (Block 318). The new version of the file and the copy and add scripts permit earlier versions of the file to be regenerated (Block 320).

The add and copy scripts are data structures used by an object oriented program (such as C++) to reconstruct a file. The add scripts and the copy scripts together provide a complete copy of the old version of the library file. By applying the scripts, a copy of the old version of the library file may be regenerated within TeamConnection (Block 320). The copy script, because it does not contain data within the new version of the file, is small in size. Together, the add script and the copy script are small in size compared with the actual size of the old version of the library file. As a result, the old version of the library file can be stored efficiently. The present invention facilitates versioning of files within an object oriented programming environment, such as TeamConnection, without requiring that entire files be transferred.

Figure 7A:
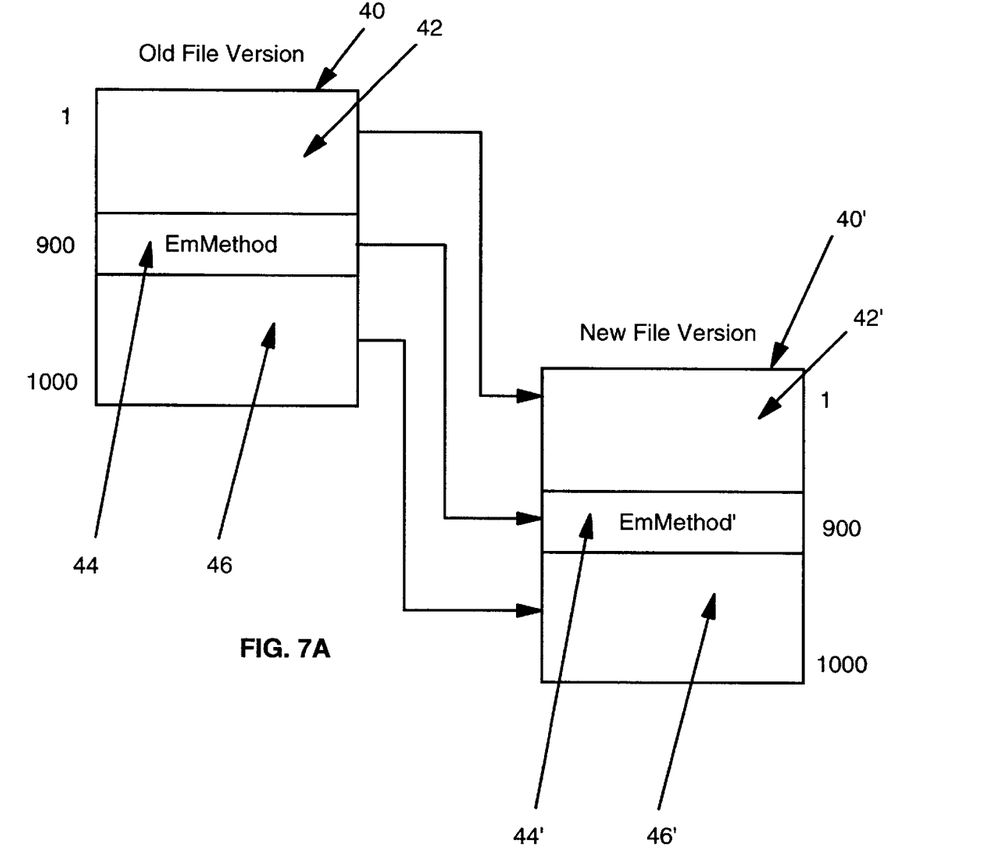
FIG. 7A schematically illustrates providing a new version of an existing library file.

Referring now to FIG. 7A, an example of providing a new version of a file via aspects of the present invention is illustrated. An existing file version 40 and a new file version 40' are shown schematically. The existing file version 40 contains 1,000 records, as indicated. For illustrative purposes, the existing file version 40 is shown in 3 sections: the first section 42 contains records 1–899; the second section 44 contains record 900; and the third section 46 contains records 901–1,000. Similarly, the new file version 40' is shown in 3 sections: the first section 42' contains records 1–899; the second section 44' contains record 900; and the third section 46' contains records 901–1,000.

Figure 7B:
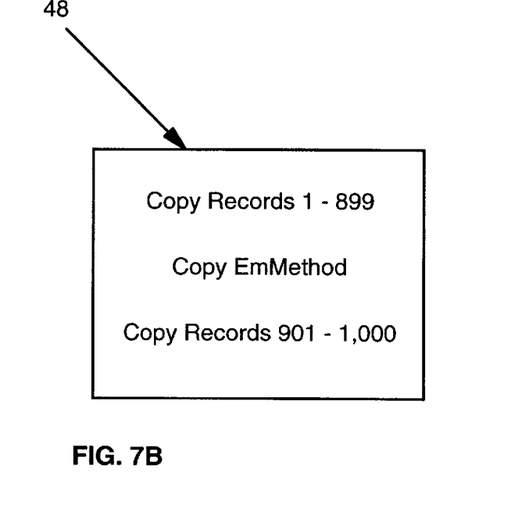
FIG. 7B schematically illustrates a copy script, according to the present invention.

Record 900 (indicated as 44) of the existing file version 40 is "EmMethod." Record 900 (indicated as 44') of the new file version 40' is "EmMethod'." The only difference between the existing file version 40 and the new file version 40" is that EmMethod has been modified and is now EmMethod'. By storing two copy scripts for Records 1–899 and 901–1,000, schematically illustrated in FIG. 7B as 48, and an add script for Record 900, the old file version 40' can be stored without having to store the entire old file version.

It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of exporting an Envy component from an Envy object oriented programming environment to a TeamConnection object oriented programming environment, the method comprising the steps of:

establishing a bridge between the Envy object oriented programming environment and the TeamConnection object oriented programming environment, wherein the bridge comprises a first portion written in Envy computer program code and a second portion written in TeamConnection computer program code;

selecting an Envy component from the Envy object oriented programming environment in response to user input;

selecting a work area within the TeamConnection object oriented programming environment, in response to user input;

creating, via the first portion of the bridge, an Envy library file containing contents of the selected Envy component;

creating, via the first portion of the bridge, a text file that describes the contents of the Envy library file; and transferring the Envy library file and the text file to the second portion of the bridge.

2. A method according to claim 1 further comprising the steps of:

searching the transferred text file for at least one keyword via the second portion of the bridge, wherein said at least one keyword identifies a respective object;

creating, via the second portion of the bridge, a TeamConnection part for each object identified by said at least one keyword; and creating a TeamConnection part to hold the contents of the Envy library file.

3. A method of importing an Envy component to an Envy object oriented programming environment from a TeamConnection object oriented programming environment, the method comprising the steps of:

establishing a bridge between the Envy object oriented Programming environment and the TeamConnection object oriented programming environment, wherein the bridge comprises a first portion written in Envy computer program code and a second portion written in TeamConnection computer program code;

selecting an Envy component from the TeamConnection object oriented programming environment in response to user input;

selecting a work area within the TeamConnection object oriented programming environment, in response to user input;

creating, via the second portion of the bridge, a TeamConnection part containing contents of the selected Envy component;

creating, via the second portion of the bridge, a text file that describes the contents of the selected Envy component; and transferring the created TeamConnection part and the text file to the first portion of the bridge.

4. A method according to claim 3 further comprising the steps of:

searching the transferred text file for at least one keyword via the first portion of the bridge, wherein said at least one keyword identifies a respective object; and transferring said identified object into the Envy object oriented programming environment.

5. A computer program product for exporting an Envy component from an Envy object oriented programming environment to a TeamConnection object oriented programming environment, comprising:

a computer usable medium having computer readable program code means embodied in said medium for establishing a bridge between the Envy object oriented programming environment and the TeamConnection object oriented programming environment, wherein the bridge comprises a first portion written in Envy computer program code and a second portion written in TeamConnection computer program code;

a computer usable medium having computer readable program code means embodied in said medium for selecting an Envy component from the Envy object oriented programming environment;

a computer usable medium having computer readable program code means embodied in said medium for selecting a work area within the TeamConnection object oriented programming environment, in response to user input;

computer readable program code means embodied in said medium for creating, via the first portion of the bridge, an Envy library file containing contents of the selected Envy component;

computer readable program code means embodied in said medium for creating, via the first portion of the bridge, a text file that describes the contents of the Envy library; and computer readable program code means embodied in said medium for transferring the Envy library file and the text file to the second portion of the bridge.

6. A computer program product according to claim 5 further comprising:

computer readable program code means embodied in said medium for searching the transferred text file for at least one keyword via the second portion of the bridge, wherein said at least one keyword identifies a respective object;

computer readable program code means embodied in said medium for creating, via the second portion of the bridge, a TeamConnection part for each object identified by said at least one keyword; and creating a TeamConnection part to hold the contents of the Envy library file.

7. A computer program product for importing an Envy component to an Envy object oriented programming environment from a TeamConnection object oriented programming environment, comprising:

a computer usable medium having computer readable program code means embodied in said medium for establishing a bridge between the Envy object oriented programming environment and the TeamConnection object oriented programming environment, wherein the bridge comprises a first portion written in Envy computer program code and a second portion written in TeamConnection computer program code;

a computer usable medium having computer readable program code means embodied in said medium for selecting an Envy component to import from the TeamConnection object oriented programming environment;

computer readable program code means embodied in said medium selecting a work area within the TeamConnection object oriented programming environment, in response to user input;

computer readable program code means embodied in said medium for creating, via the second portion of the bridge, a TeamConnection part containing contents of the selected Envy component;

computer readable program code means embodied in said medium for creating, via the second portion of the bridge, a text file that describes the contents of the selected Envy component file; and computer readable program code means embodied in said medium for transferring the created TeamConnection part and the text file to the first portion of the bridge.

8. A computer program product according to claim 7 further comprising:

computer readable program code means embodied in said medium for searching the transferred text file for at least one keyword via the second portion of the bridge, wherein said at least one keyword identifies a respective object; and computer readable program code means embodied in said medium for transferring said identified object to the first portion of the bridge.

9. A data processing system for exporting an Envy component from an Envy object oriented programming environment to a TeamConnection object oriented programming environment, comprising:

means for establishing a bridge between the Envy object oriented programming environment and the TeamConnection object oriented programming environment, wherein the bridge comprises a first portion written in Envy computer program code and a second portion written in TeamConnection computer program code;

means for selecting an Envy component from the Envy object oriented programming environment;

means for selecting a work area within the TeamConnection object oriented programming environment, in response to user input;

first means, responsive to the selecting means for creating, via the first portion of the bridge, an Envy library file containing contents of the selected Envy component;

second means, responsive to the to the selecting means for creating, via the first portion of the bridge, a text file that describes the contents of the Envy library file; and means, responsive to the Envy library file and the text file creating means for transferring the Envy library file and the text file to the second portion of the bridge.

10. A data processing system according to claim 9 further comprising:

means for searching the transferred text file for at least one keyword via the second portion of the bridge, wherein said at least one keyword identifies a respective object;

means, responsive to the searching means, for creating via a second portion of the bridge, a TeamConnection part for each object identified by said at least one keyword; and means for creating a TeamConnection part to hold the contents of the Envy library file.

11. A data processing system for importing an Envy component to an Envy object oriented programming environment from a TeamConnection object oriented programming environment, comprising:

means for establishing a bridge between the Envy object oriented programming environment and the TeamConnection object oriented programming environment, wherein the bridge comprises a first portion written in Envy computer program code and a second portion written in TeamConnection computer program code;

means for selecting an Envy component to import from the TeamConnection object oriented programming environment;

means for selecting a work area within the TeamConnection object oriented programming environment, in response to user input;

means, responsive to the selecting means, for creating, via the second portion of the bridge, a TeamConnection part containing contents of the selected Envy component;

means, responsive to the selecting means, for creating, via the second portion of the bridge, a text file that describes the contents of the selected Envy component; and means, responsive to the means for creating the TeamConnection part and the text file, for transferring the created TeamConnection part and the text file to the first portion of the bridge.

12. A data processing system according to claim 11 further comprising:

means for searching the transferred text file for at least one keyword via the second portion of the bridge, wherein said at least one keyword identifies a respective object; and means, responsive to the searching means, for transferring said identified object to the first portion of the bridge.

13. A data processing system for exporting an Envy component from an Envy object oriented programming environment to a TeamConnection object oriented programming environment and for importing an Envy component to an Envy object oriented programming environment from a TeamConnection object oriented programming environment, comprising:

means for establishing a bridge between the Envy object oriented programming environment and the TeamConnection object oriented programming environment, wherein the bridge comprises a first portion written in Envy computer program code and a second portion written in TeamConnection computer program code;

means for selecting an Envy component from the Envy object oriented programming environment;

means for selecting a work area within the TeamConnection object oriented programming environment, in response to user input;

first means, responsive to the selecting means for creating, via the first portion of the bridge an Envy library file containing contents of the selected Envy component;

second means, responsive to the to the selecting means for creating, via the first portion of the bridge a text file that describes the contents of the Envy library file;

means, responsive to the Envy library file and the text file creating means for transferring the Envy library file and the text file to the second portion of the bridge;

means for selecting an Envy component to import from the TeamConnection object oriented programming environment;

means, responsive to the selecting means, for creating, via the second portion of the bridge, a TeamConnection part containing contents of the selected Envy component;

means, responsive to the selecting means, for creating, via the second portion of the bridge, a text file that describes the contents of the selected Envy component; and means, responsive to the means for creating the TeamConnection part and the text file, for transferring the TeamConnection part and the text file to the first portion of the bridge.

14. A data processing system according to claim 13 further comprising:

means for searching the transferred text file for at least one keyword via the second portion of the bridge, wherein said at least one keyword identifies a respective object; and means, responsive to the searching means, for creating a TeamConnection part for an object identified by said at least one keyword.

15. A data processing system according to claim 13 further comprising:

means for searching the transferred text file for at least one keyword, wherein said at least one keyword identifies a respective object; and means, responsive to the searching means, for transferring said identified object to the first portion of the bridge.

* * * * *